(No Model.)
K. MAYER.
SKATING FLOOR.
No. 557,077. Patented Mar. 24, 1896.
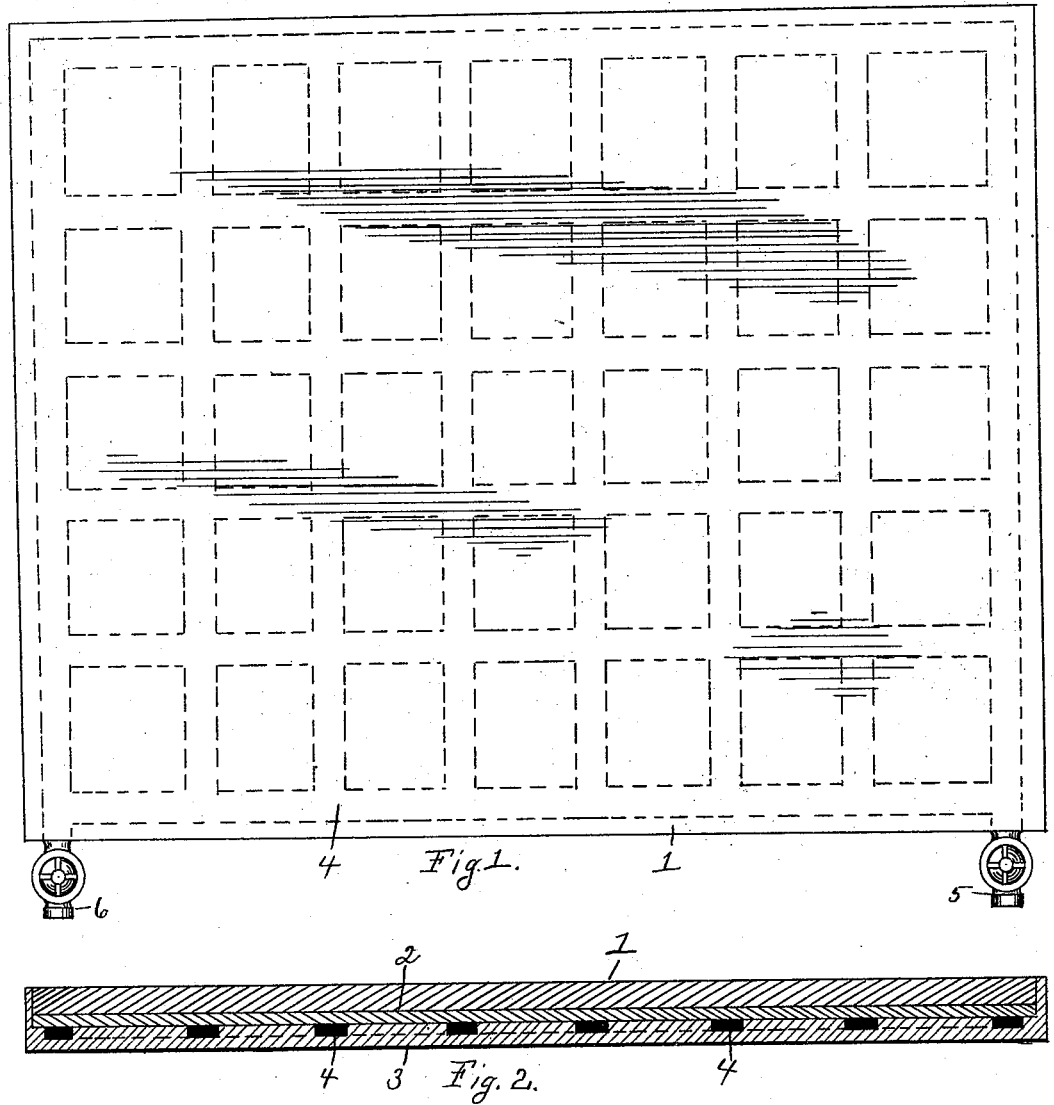

UNITED STATES PATENT OFFICE.

KARL MAYER, OF NEW YORK, N. Y., ASSIGNOR, BY DIRECT AND MESNE ASSIGNMENTS, TO ERNST THALMANN, OF SAME PLACE.

SKATING-FLOOR.

SPECIFICATION forming part of Letters Patent No. 557,077, dated March 24, 1896.

Application filed July 20, 1895. Serial No. 556,614. (No model.)

*To all whom it may concern:*

Be it known that I, KARL MAYER, residing at New York, in the county of New York and State of New York, have invented a certain new, useful, and valuable Improvement in Skating-Floors, of which the following is a full, clear, and exact description.

My invention has relation to artificial-ice planums or surfaces adapted to be used to skate upon; and it consists in the novel construction and arrangement of its parts as hereinafter described.

In the accompanying drawings, Figure 1 is a top plan view of the planum. Fig. 2 is a section view of the same.

The planum or surface 1 is made of sodium carbonate, which is first boiled, then crystallized in a sheet, as shown. This sheet of sodium carbonate is placed on a porous material 2, which extends under the entire under side of the planum. The porous material rests on the floor 3. The said floor is provided with a number of channels 4, which extend in every direction under the material 2. Said channels are provided with an inlet 5 and an outlet 6. (See Fig. 1.) The porous material 2 may be of wood or any other suitable material.

When the sodium carbonate is first softened, about five per cent. of potassium carbonate is added, and when the soda is crystallized the potassium carbonate makes a very hard surface.

Water is forced in the channels 4 through the inlet 5. The water then passes through the porous material 2 and comes in contact with the planum 1. This prevents the air from affecting the sodium carbonate, thus retaining a hard planum or surface.

The liquid may be forced in the channels by gas-pressure or any other pressure.

Having described my invention, what I claim as new, and desire to secure by Letters Patent, is—

1. A floor, channels located in the upper surface of the floor, a porous material located on said floor, an artificial-ice surface located on the porous material, said ice surface being open and exposed to the action of the atmosphere, a preservative in liquid form adapted to flow through the channels, as set forth.

2. A floor, channels located in the upper surface of the floor, a porous material located on said floor, an artificial-ice surface located on the porous material, a preservative in liquid form adapted to flow through the channels, suitable stationary inlets and outlets connected with said channels under the porous material, as set forth.

3. A floor, channels located in the upper surface of the floor, a porous material located on said floor, an artificial-ice surface located on the porous material, a preservative in liquid form introduced into said channels under a pressure, as set forth.

In testimony whereof I affix my signature in presence of two witnesses.

KARL MAYER.

Witnesses:
THOMAS FORD,
MICHAEL RYAN.